United States Patent
Kumar et al.

(10) Patent No.: US 11,975,460 B2
(45) Date of Patent: May 7, 2024

(54) PREFORM DESIGN FOR LIGHTWEIGHT CONTAINER

(71) Applicant: AMCOR RIGID PACKAGING USA, LLC, Ann Arbor, MI (US)

(72) Inventors: Pankaj Kumar, Dexter, MI (US); Mark Woloszyk, Chelsea, MI (US)

(73) Assignee: AMCOR RIGID PACKAGING USA, LLC, Ann Arbor, MI (US)

( * ) Notice: Subject to any disclaimer, the term of this patent is extended or adjusted under 35 U.S.C. 154(b) by 353 days.

(21) Appl. No.: 17/435,839

(22) PCT Filed: Feb. 28, 2020

(86) PCT No.: PCT/US2020/020277
§ 371 (c)(1),
(2) Date: Sep. 2, 2021

(87) PCT Pub. No.: WO2020/180642
PCT Pub. Date: Sep. 10, 2020

(65) Prior Publication Data
US 2022/0152877 A1 May 19, 2022

Related U.S. Application Data

(60) Provisional application No. 62/813,434, filed on Mar. 4, 2019.

(51) Int. Cl.
| B29B 11/14 | (2006.01) |
| B29B 11/08 | (2006.01) |
| B29K 67/00 | (2006.01) |

(52) U.S. Cl.
CPC .............. *B29B 11/14* (2013.01); *B29B 11/08* (2013.01); *B29C 2949/078* (2022.05);
(Continued)

(58) Field of Classification Search
None
See application file for complete search history.

(56) References Cited

U.S. PATENT DOCUMENTS

| 5,626,944 A | 5/1997 | Rasmussen |
| 5,714,111 A | 2/1998 | Beck et al. |
| (Continued) | | |

FOREIGN PATENT DOCUMENTS

| CA | 3132624 A1 | 9/2020 |
| EP | 0244128 A2 | 11/1987 |
| (Continued) | | |

OTHER PUBLICATIONS

Supplementary European Search Report issued in corresponding European Patent Application No. 20766040 dated Oct. 6, 2022.
(Continued)

*Primary Examiner* — Elizabeth Collister
(74) *Attorney, Agent, or Firm* — Harness, Dickey & Pierce, P.L.C.

(57) ABSTRACT

A preform configured to form a container by stretch blow molding. The preform includes a finish portion and a tip portion. The finish portion is at a first end of the preform and is a container finish of the container. The tip portion is at a second end of the preform opposite to the first end. The tip portion is configured to form a container base and a container heel of the container. An outer surface of the tip portion includes a flat surface, a first radius on a first side of the flat surface, a second radius between the first radius and the flat surface, a third radius extending from the flat surface on a second side of the flat surface, and a fourth radius extending from the third radius towards the second end of the preform through which a longitudinal axis of the preform extends.

23 Claims, 4 Drawing Sheets

(52) U.S. Cl.
CPC .......... *B29C 2949/0818* (2022.05); *B29C 2949/0836* (2022.05); *B29C 2949/0856* (2022.05); *B29C 2949/20* (2022.05); *B29K 2067/003* (2013.01)

(56) References Cited

U.S. PATENT DOCUMENTS

| | | |
|---|---|---|
| 9,422,076 B2 | 8/2016 | Lane et al. |
| 9,617,029 B2 | 4/2017 | Lane et al. |
| 9,694,930 B2 | 7/2017 | Lane et al. |
| 9,833,938 B2 | 12/2017 | Lane et al. |
| 2003/0031814 A1 | 2/2003 | Hutchinson et al. |
| 2009/0155501 A1 | 6/2009 | Witz et al. |
| 2010/0055369 A1* | 3/2010 | Kelley .......... B29C 49/071 428/339 |
| 2016/0257029 A1 | 9/2016 | Lane et al. |
| 2017/0252958 A1 | 9/2017 | Lane et al. |
| 2018/0305064 A1 | 10/2018 | Lane et al. |

FOREIGN PATENT DOCUMENTS

| | | |
|---|---|---|
| MX | 2011002300 A | 5/2011 |
| WO | 2018106240 A1 | 6/2018 |

OTHER PUBLICATIONS

Office Action issued in corresponding Colombian Patent Application NC2021/0011843 dated Apr. 28, 2023.
International Search Report and Written Opinion of the ISA issued in PCT/US2020/020277, dated Jun. 25, 2020; ISA/KR.

\* cited by examiner

PREFORM DESIGN FOR LIGHTWEIGHT CONTAINER

CROSS-REFERENCE TO RELATED APPLICATIONS

This application is a U.S. National Phase Application under 35 U.S.C. 371 of International Application No. PCT/US2020/020277, filed on Feb. 28, 2020, which claims the benefit of U.S. Provisional Application No. 62/813,434, filed on Mar. 4, 2019. The entire disclosures of the above applications are incorporated herein by reference.

FIELD

The present disclosure relates to a preform configured to be blow molded into a lightweight, carbonated soda, water, hot-fill container.

BACKGROUND

This section provides background information related to the present disclosure, which is not necessarily prior art.

As a result of environmental and other concerns, plastic containers, more specifically polyester and even more specifically polyethylene terephthalate (PET) containers, are now being used more than ever to package numerous commodities previously supplied in glass containers. Manufacturers and fillers, as well as consumers, have recognized that PET containers are lightweight, inexpensive, recyclable and manufacturable in large quantities.

Blow-molded plastic containers have become commonplace in packaging numerous commodities. PET is a crystallizable polymer, meaning that it is available in an amorphous form or a semi-crystalline form. The ability of a PET container to maintain its material integrity relates to the percentage of the PET container in crystalline form, also known as the "crystallinity" of the PET container. The following equation defines the percentage of crystallinity as a volume fraction:

$$\% \text{ Crystallinity} = \left(\frac{\rho - \rho_a}{\rho_c - \rho_a}\right) \times 100$$

where $\rho$ is the density of the PET material; $\rho_a$ is the density of pure amorphous PET material (1.333 g/cc); and $\rho_c$ is the density of pure crystalline material (1.455 g/cc).

Container manufacturers use mechanical processing and thermal processing to increase the PET polymer crystallinity of a container. Mechanical processing involves orienting the amorphous material to achieve strain hardening. This processing commonly involves stretching an injection molded PET preform along a longitudinal axis and expanding the PET preform along a transverse or radial axis to form a PET container. The combination promotes what manufacturers define as biaxial orientation of the molecular structure in the container. Manufacturers of PET containers currently use mechanical processing to produce PET containers having approximately 20% crystallinity in the container's sidewall.

Thermal processing involves heating the material (either amorphous or semi-crystalline) to promote crystal growth. On amorphous material, thermal processing of PET material results in a spherulitic morphology that interferes with the transmission of light. In other words, the resulting crystalline material is opaque, and thus, generally undesirable.

Used after mechanical processing, however, thermal processing results in higher crystallinity and excellent clarity for those portions of the container having biaxial molecular orientation. The thermal processing of an oriented PET container, which is known as heat setting, typically includes blow molding a PET preform against a mold heated to a temperature of approximately 250° F.-350° F. (approximately 121° C.-177° C.), and holding the blown container against the heated mold for approximately two (2) to five (5) seconds. Manufacturers of PET juice bottles, which must be hot-filled at approximately 185° F. (85° C.), currently use heat setting to produce PET bottles having an overall crystallinity in the range of approximately 25%-35%.

While current containers are suitable for their intended use, they are subject to improvement. For example, a container having reduced weight and increased strength, and a preform configured to form the container by stretch blow molding, would be desirable.

SUMMARY

This section provides a general summary of the disclosure, and is not a comprehensive disclosure of its full scope or all of its features.

The present disclosure includes a preform configured to form a container by stretch blow molding. The preform includes a finish portion and a tip portion. The finish portion is at a first end of the preform and is a container finish of the container. The tip portion is at a second end of the preform opposite to the first end. The tip portion is configured to form a container base and a container heel of the container. An outer surface of the tip portion includes a flat surface, a first radius on a first side of the flat surface, a second radius between the first radius and the flat surface, a third radius extending from the flat surface on a second side of the flat surface, and a fourth radius extending from the third radius towards the second end of the preform through which a longitudinal axis of the preform extends.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
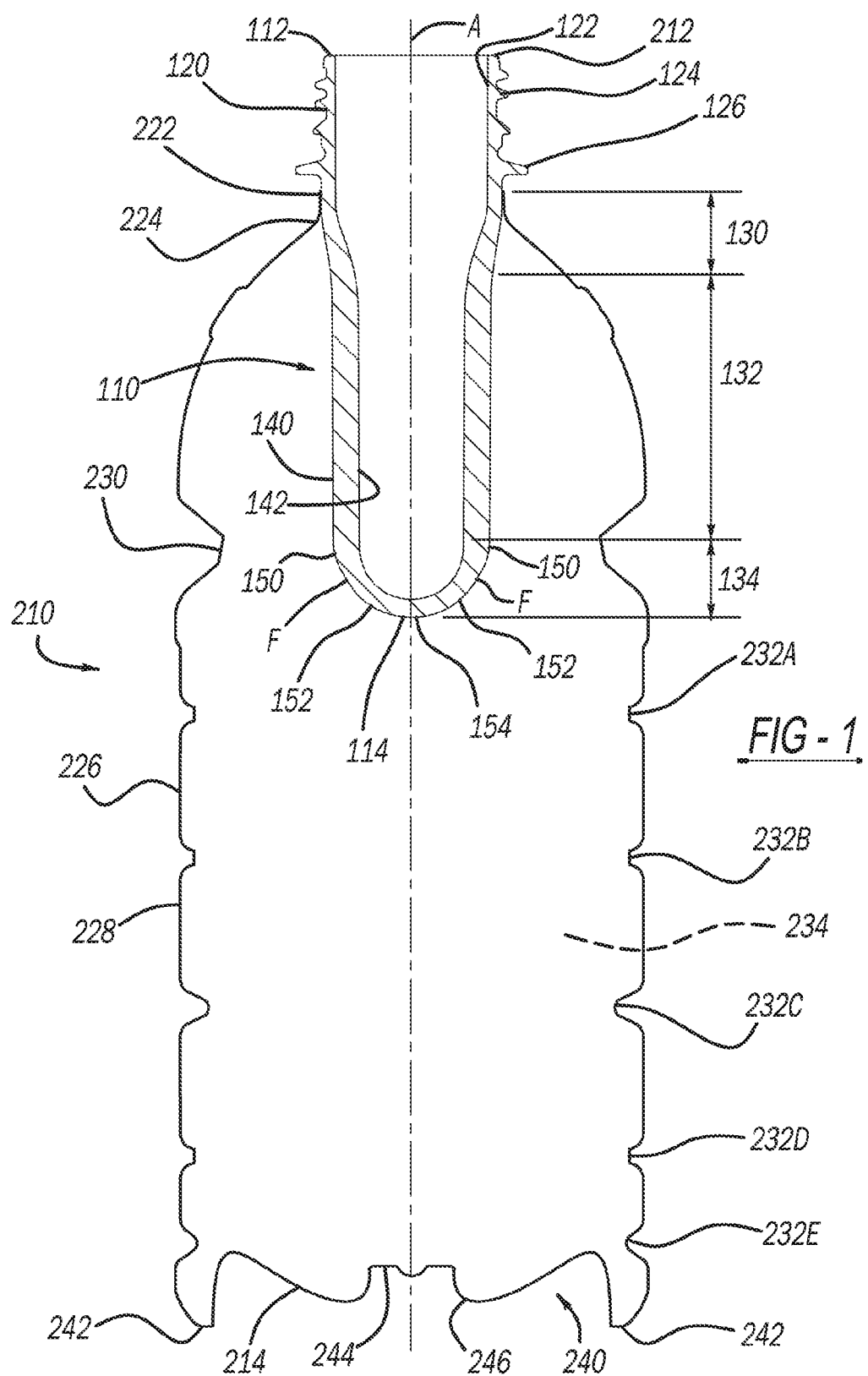
FIG. 1 is a cross-sectional view of a preform according to the present teachings, and a container according to the present teachings formed by stretch blow molding the preform.

With initial reference to FIG. 1, a preform according to the present teachings is generally illustrated at reference numeral 110. The preform 110 can be made of any suitable material. Any suitable polymeric material can be used, such as polyethylene terephthalate (PET) for example. The preform 110 can be formed in any suitable manner, such as by injection molding.

The preform 110 is configured to form container 210 in any suitable manner, such as by blow molding. In particular, a 2-step stretch blow molding process may be used, as is known in the art. The container 210 can be any suitable container of any suitable size, such as a 12-20 ounce container configured to store carbonated soda drinks, water, hot-fill products etc. The preform 110 has a geometry as described herein optimized for blow molding into the lightweight container 210 having less than 2 grams of container material per ounce of container capacity. The geometry of the preform 110 provides the container 210 with any suitable base 240, such as a petaloid base, strapped base, or hot-fill base (see FIG. 3). The container 210 will be further described herein, after the description of the preform 110.

The preform 110 generally includes a first end 112 and a second end 114 opposite thereto. At the first end 112 is a finish portion 120 of the preform 110, which is also a container finish of the container 210. At the first end 112 the finish 120 defines an opening 122 of the preform 110, which also provides a container opening of the container 210. Extending from an outer surface of the finish 120 are threads 124, which can be any suitable threads configured to cooperate with a closure for closing the opening 122. Also extending from the finish 120 is a support ring 126, which can be used for supporting the preform 110 in a stretch blow molding machine, and which may provide the finish 120 with increased strength.

Between the finish 120 and the second end 114, the preform 110 includes a shoulder portion 130, a body portion 132, and a tip or base/heel portion 134. The shoulder portion 130 is adjacent to, or generally adjacent to, the finish 120. The base/heel portion 134 extends from the second end 114 towards the first end 112. The body portion 132 is between the shoulder portion 130 and the base/heel portion 134. As explained in detail herein, the shoulder portion 130 is configured to form a container shoulder 224 of the container 210, and may be configured to form a container neck 222 as well. The body portion 132 is configured to form a container main body portion 226 of the container 210. The base/heel portion 134 is configured to form a container base 240 and a container heel 242 of the container 210.

The preform 110 further includes an outer surface 140 and an inner surface 142, which is opposite to the outer surface 140. The inner and outer surfaces 140 and 142 extend about each one of the shoulder portion 130, the body portion 132, and the base/heel portion 134. The inner and outer surfaces 140 and 142 terminate prior to reaching the finish portion 120. At the base/heel portion 134, the outer surface 140 includes a flat portion F. The flat portion F is between a first curved portion 150 (on a side of the flat portion F opposite to the second end 114) and a second curved portion 152 (on a side of the flat portion F extending to the second end 114). As explained herein, the first curved portion 150 includes a first radius $R_1$ and a second radius $R_2$. The second curved portion 152 includes a third radius $R_3$ and a fourth radius $R_4$.

Figure 5:
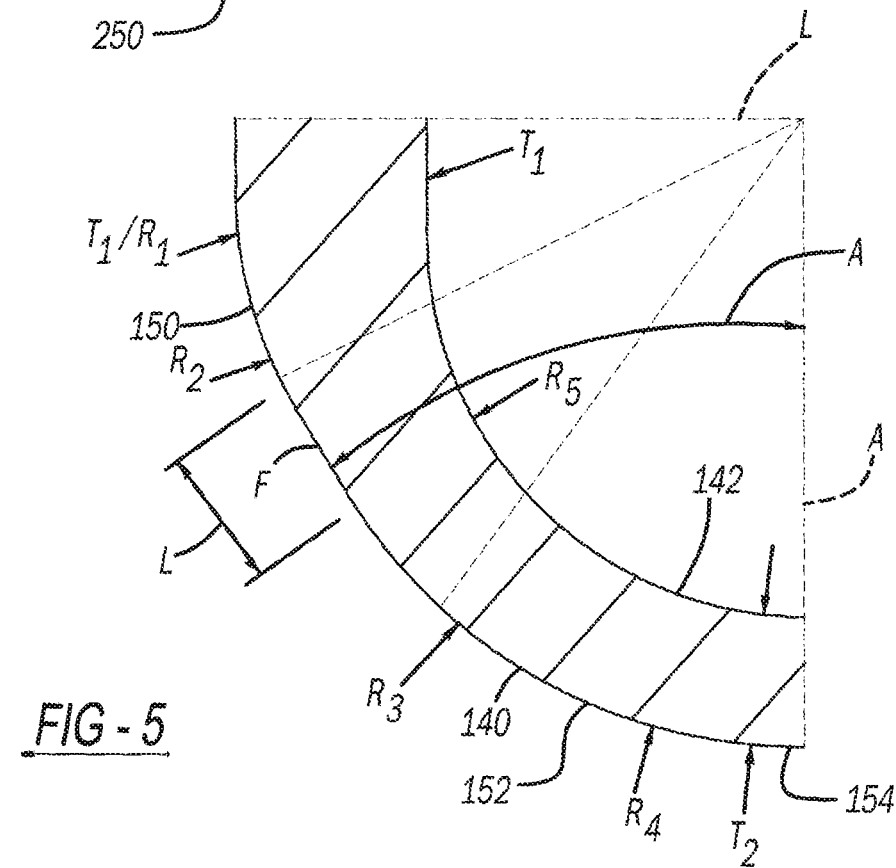
FIG. 5 is a close-up view of one-half of a base/heel portion of the preform in cross-section.

The flat portion F is angled outward from the longitudinal axis A at an angle of 31° (see angle A of FIG. 5).

The preform 110 is generally circular, and is closed at the second end 114 by the base/heel portion 134. From the curved portion 150 the base/heel portion 134 tapers inward towards the second end 114. The longitudinal axis A of the preform 110 extends through an axial center of the opening 122 at the first end 112, and through an axial center of the base/heel portion 134 at the second end 114. The base/heel portion 134 includes a gate portion 154 for injecting plastic arranged such that the longitudinal axis A extends through a center of the gate portion 154.

With continued reference to FIG. 1 and additional reference to FIG. 2, the container 210 and the portions of the preform 110 that form different features of the container 210 will now be described in detail. The container 210 includes the finish 120 of the preform 110 at a first or upper end 212 of the container 210. A second or lower end 214 of the container 210 is opposite to the first end 212.

Extending from the finish 120 towards the second or lower end 214 is the container neck 222. From the container neck 222 extends a container shoulder 224. The container shoulder 224 extends to the container main body portion 226, which extends to the container base 240. The sidewall 228 of the container 210 forms at least the container shoulder 224, and the container main body portion 226. The sidewall 228 and the container base 240 together define an internal volume 234 of the container 210.

Between the container shoulder 224 and the container main body portion 226 is an inwardly tapered portion 230 defined by the sidewall 228. The sidewall 228 further defines a plurality of ribs 232A-232E. Any suitable number of ribs 232 can be provided, such as five ribs 232A to 232E as illustrated. The ribs 232 can be any suitable shape or size. For example, the rib 232C can be larger, or recessed further within the container 210, than the other ribs 232A, 232B, 232D, and 323E. The inwardly tapered portion 230 can be recessed further within the container 210 than each of the ribs 232A-232E as illustrated.

Figure 3:
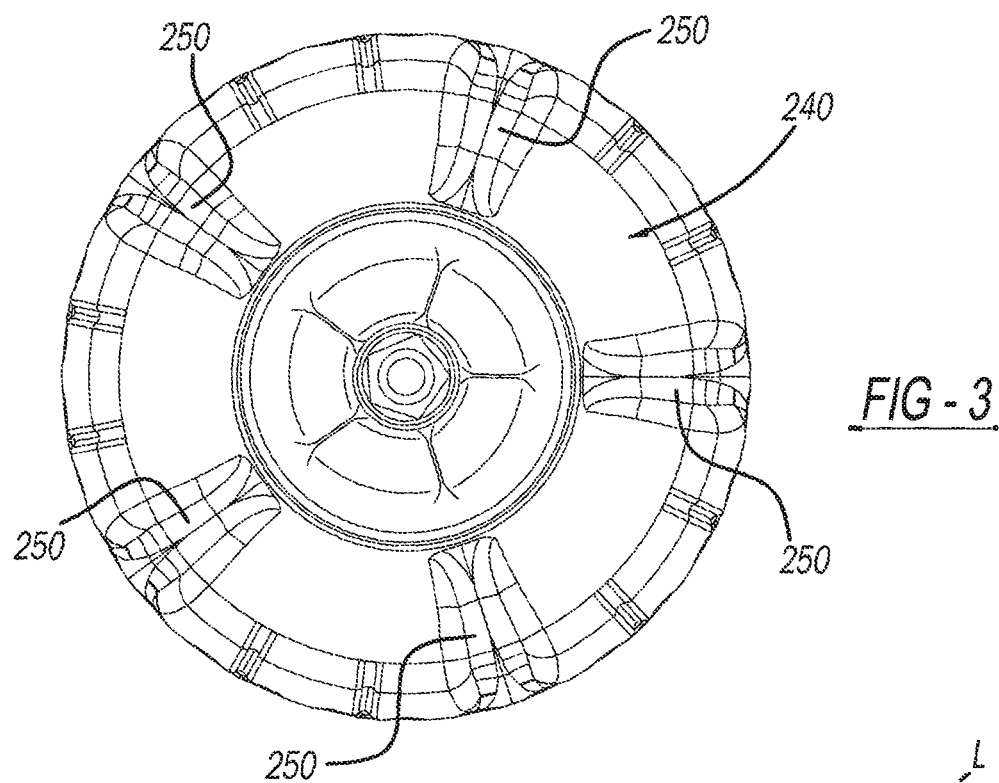
FIG. 3 illustrates an exemplary base of the container.

The container base 240 generally includes a heel 242 at the second or lower end 214. The base also includes a central portion 244. The longitudinal axis A of the container 210 extends through an axial center of the central portion 244. A diaphragm 246 is between the central portion 244 and the heel 242. Additional features of the base 240 are illustrated in FIG. 3. As illustrated in FIG. 3, the exemplary base 240 includes five straps 250, thus making the base 240 a strapped base. The base 240 may have any other suitable configuration as well such as petaloid or vacuum absorbing hot-fill base.

Figure 2:
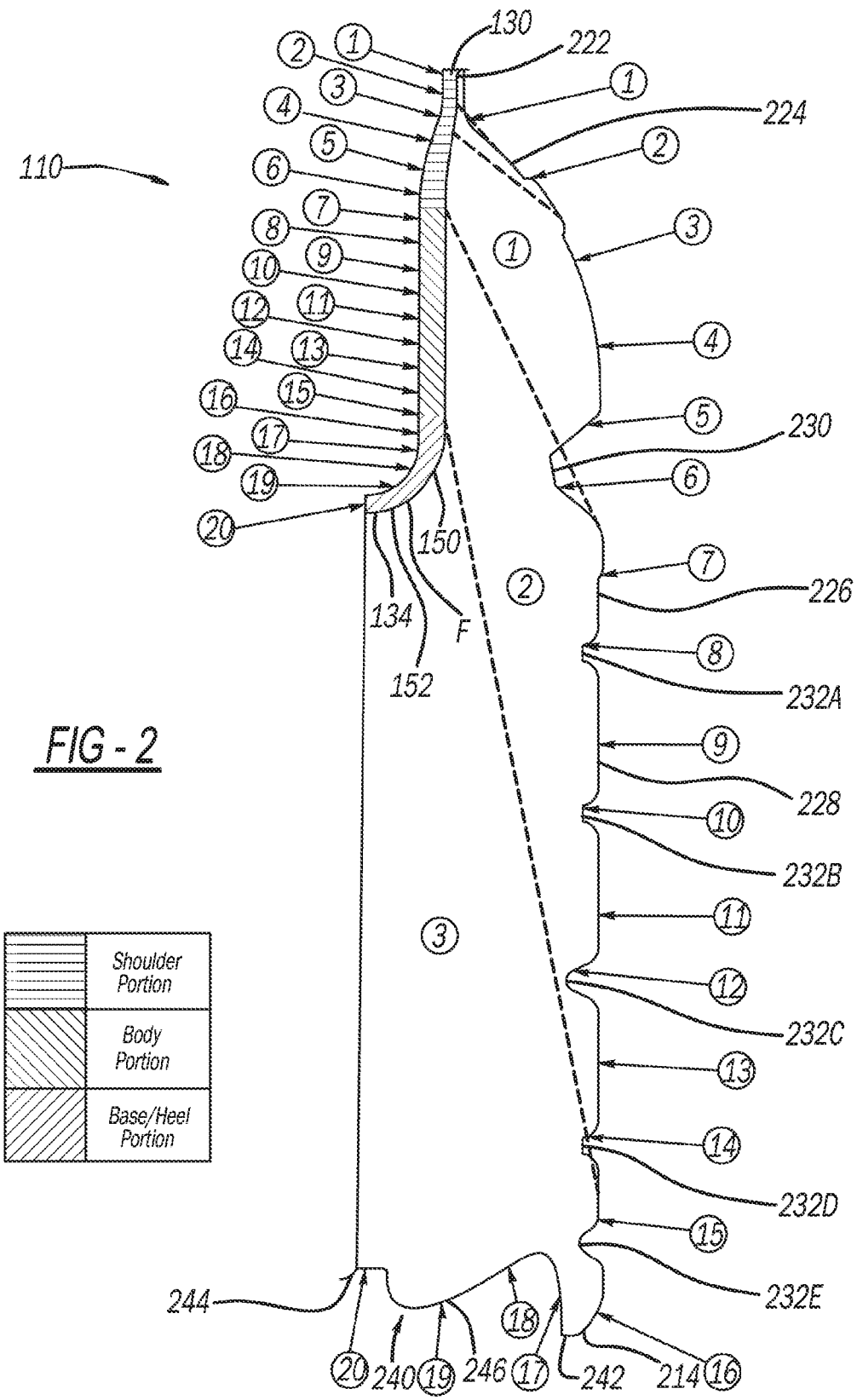
FIG. 2 is a cross-sectional view of one-half of the preform of FIG. 1 and one-half of the container of FIG. 1, portions of the preform are projected onto the container to illustrate the different portions of the container formed by different portions of the preform.

FIG. 2 identifies various sections of the preform 110 at reference numerals 1-3. Specifically, section 1 of the shoulder portion 130 of the preform 110 forms the container shoulder 224. Section 2 of the body portion 132 of the preform 110 forms the container main body portion 226. Section 3 of base/heel portion 134 of the preform 110 forms the container heel 242 and the container base 240. The flat portion F is included with the base/heel portion 134 of the preform 10, and forms portions of the container 210 at, and proximate to, the container heel 242. The base/heel portion 134 of the preform 110 advantageously locates the heaviest material band in the heel 242, and locates the lightest material band at the center of the second end 114 around the gate portion 154.

The container 210 can have any suitable dimensions or capacity. For example, the container 210 can have an overall diameter of about 2.4 inches, an overall height of about 7.7 inches, and an overall capacity of about 12-20 ounces. The container 210 can have less than 2.0 grams (such as about 1.5 grams) of container material per ounce of container capacity. The preform 110 can further provide the container 210 with the heaviest material band in the heel 242 of the container, and the lightest material band at the base 240, for example, which facilitates movement of the base 240 to absorb vacuum forces when using any of the base designs disclosed in any of the following U.S. patent applications, for example, each of which is incorporated herein by reference: Ser. Nos. 14/238,789; 14/238,795; 14/465,494; and 14/424,569.

Figure 4:
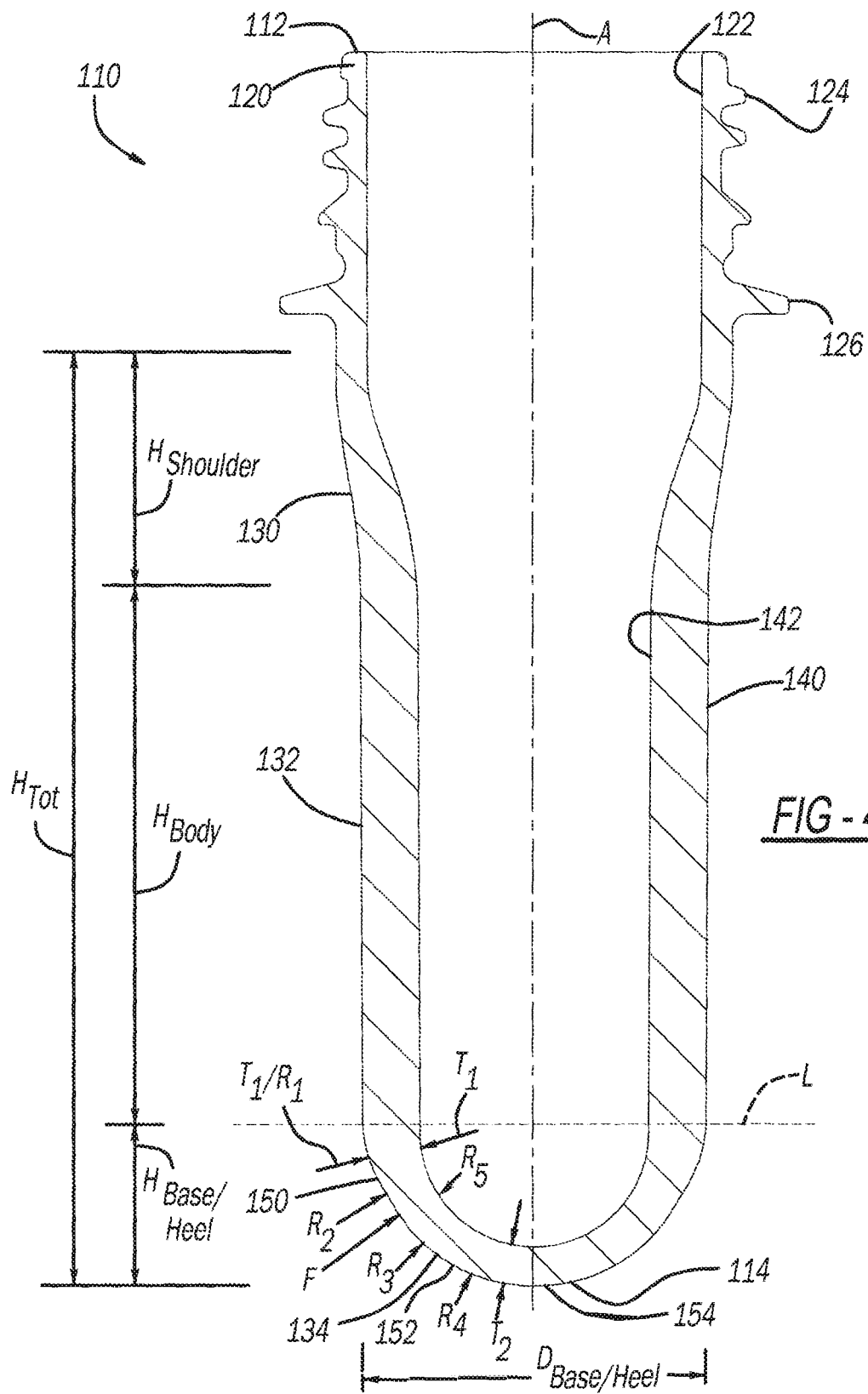
FIG. 4 is a cross-sectional view of the preform of FIG. 1.

With continued reference to FIGS. 1-3, and additional reference to FIGS. 4 and 5, various additional exemplary dimensions and features of the preform 110 will now be described. The preform 110 includes thicknesses $T_1$ and $T_2$. Thickness $T_1$ is where the base/heel portion 134 meets the body portion 132. From thickness $T_1$, the base/heal portion 134 gradually tapers inward such that the base/heel portion 134 is most narrow at thickness $T_2$ proximate to the second end 114 and the gate portion 154. The thickness $T_1$ can be any suitable thickness, such as about 0.15". The thickness $T_2$ can be any suitable thickness, such as about 0.10".

The preform 110 further includes various curve radii $R_1$, $R_2$, $R_3$, $R_4$, and $R_5$. Curve radii $R_1$, $R_2$, $R_3$, and $R_4$ are each external curve radii, which are curved surfaces of the outer surface 140 of the preform 110. Curve radius $R_5$ is an internal radius at the inner surface 142 of the preform 110. Curve radii $R_1$ and $R_2$ are on a side of the flat surface F proximate to the body portion 132. Curve radii $R_3$ and $R_4$ are on a side of the flat surface F proximate to the second end 114 and the gate portion 154. Thus, the curve radii $R_1$ and $R_2$ are on a first side of the flat surface F that is opposite to a second side of the flat surface F that the curve radii $R_3$ and $R_4$ are on. The flat portion F can have any suitable length L (see FIG. 5). For example, the flat portion F can have a length of 1.7".

The internal curve radius $R_5$ extends along the entire inner surface 142 of the base/heel portion 134 from the body portion 132 to the second end 114. The internal curve radius $R_5$ is a single radius that is revolved around the longitudinal axis A. The internal curve radius $R_5$ is smaller than each one of the external curve radii $R_1$, $R_2$, $R_3$, and $R_4$.

The curve radii $R_1$, $R_2$, $R_3$, $R_4$, and $R_5$ can have any suitable dimensions. The curve radius $R_1$ can be 0.33" for example. The curve radius $R_2$ can be 0.39" for example. The curve radius $R_3$ can be 0.40" for example. The curve radius $R_4$ can be 0.44" for example. Thus, the curve radii $R_1$, $R_2$, $R_3$, and $R_4$ progressively increase towards the second end 114. The curve radius $R_5$ can be 0.3" for example. Thus, the curve radius $R_5$ can be less than each one of the curve radii $R_1$, $R_2$, $R_3$, and $R_4$.

The preform has a total height $H_{tot}$ extending from the second end 114 to the support ring 126, or about the support ring 126. The shoulder portion 130 of the preform 110 includes a height $H_{shoulder}$. The body portion 132 has a height $H_{body}$. The base/heel portion 134 includes a height $H_{base/heel}$. The dimensions of the different heights H can be any suitable dimensions, and can vary based on the desired size of the container 210. For example, the height of the base/heel portion $H_{base/heel}$ can be 0.4" or about 0.4". The diameter of the base/heel portion $D_{base/heel}$ can be 0.88" or about 0.88".

The present disclosure thus advantageously provides for the preform 110 from which the container 210 is formed by 2-step stretch blow molding as a relatively lighter weight container as compared to existing containers. The resulting container 210 also has relatively controlled material distribution. Material weight and strength are focused in the heal 242 for increased standing support. Relatively thinner/lighter material is at the center of the base 240.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A preform configured to form a container by stretch blow molding, the preform comprising:
   a finish portion at a first end of the preform, the finish portion is a container finish of the container;
   a tip portion at a second end of the preform opposite to the first end, the tip portion configured to form a container base and a container heel of the container; and
   an outer surface of the tip portion including a flat surface, a first radius on a first side of the flat surface, a second radius between the first radius and the flat surface, a third radius extending from the flat surface on a second side of the flat surface, and a fourth radius extending from the third radius towards the second end of the preform through which a longitudinal axis of the preform extends;
   wherein the second radius is greater than the first radius.

2. The preform of claim 1, wherein the fourth radius is greater than the third radius.

3. The preform of claim 1, wherein the fourth radius is greater than the third radius, the third radius is greater than the second radius, and the second radius is greater than the first radius.

4. The preform of claim 3, wherein an inner surface of the preform includes a fifth radius that extends entirely across the inner surface; and
   wherein the fifth radius is smaller than each one of the first radius, the second radius, the third radius, and the fourth radius.

5. The preform of claim 1, wherein an inner surface of the preform includes a fifth radius that extends entirely across the inner surface.

6. The preform of claim 5, wherein the fifth radius is about 0.3".

7. The preform of claim 1, wherein the first radius is about 0.33".

8. The preform of claim 1, wherein the second radius is about 0.39".

9. The preform of claim 1, wherein the third radius is about 0.40".

10. The preform of claim 1, wherein the fourth radius is about 0.44".

11. The preform of claim 1, wherein the flat surface is about 0.068" long.

12. The preform of claim 1, wherein the flat surface is angled outward from the longitudinal axis of the preform.

13. The preform of claim 12, wherein the flat surface is angled outward from the longitudinal axis of the preform about 31°.

14. The preform of claim 1, wherein the tip portion is most thin at the second end through which the longitudinal axis extends; and
    wherein the tip portion gradually increases in thickness as the tip portion extends outward from the longitudinal axis.

15. The preform of claim 1, wherein at a thinnest portion the tip portion is about 0.10" thick, and at a thickest portion the tip portion is about 0.15" thick.

16. The preform of claim 1, wherein the tip portion has a maximum height of about 0.4".

17. The preform of claim 1, wherein the tip portion has a maximum diameter of about 0.88".

18. The preform of claim 1, wherein the preform is configured to form the container with a petaloid base, strap base, or hot-fill base.

19. The preform of claim 1, wherein the preform is injection molded.

20. The preform of claim 1, wherein the preform is configured to form the container such that the container includes less than 2 g of container material per ounce of container capacity.

21. The preform of claim 1, wherein the preform is configured to form the container such that the container heel includes a first material band and a center of the container base includes a second material band, the first material band is a thicker than the second material band.

22. A preform configured to form a container by stretch blow molding, the preform comprising:
    a finish portion at a first end of the preform, the finish portion is a container finish of the container;
    a tip portion at a second end of the preform opposite to the first end, the tip portion configured to form a container base and a container heel of the container; and
    an outer surface of the tip portion including a flat surface, a first radius on a first side of the flat surface, a second radius between the first radius and the flat surface, a third radius extending from the flat surface on a second side of the flat surface, and a fourth radius extending from the third radius towards the second end of the preform through which a longitudinal axis of the preform extends;
    wherein the fourth radius is greater than the third radius.

23. A preform configured to form a container by stretch blow molding, the preform comprising:
    a finish portion at a first end of the preform, the finish portion is a container finish of the container;
    a tip portion at a second end of the preform opposite to the first end, the tip portion configured to form a container base and a container heel of the container; and
    an outer surface of the tip portion including a flat surface, a first radius on a first side of the flat surface, a second radius between the first radius and the flat surface, a third radius extending from the flat surface on a second side of the flat surface, and a fourth radius extending from the third radius towards the second end of the preform through which a longitudinal axis of the preform extends;
    wherein the tip portion is most thin at the second end through which the longitudinal axis extends; and
    wherein the tip portion gradually increases in thickness as the tip portion extends outward from the longitudinal axis.

* * * * *